US009223528B2

(12) United States Patent
Tecu

(10) Patent No.: US 9,223,528 B2
(45) Date of Patent: Dec. 29, 2015

(54) ELECTRONIC CONTENT MANAGEMENT WORKFLOW

(71) Applicant: Konica Minolta Laboratory U.S.A., Inc., San Mateo, CA (US)

(72) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/954,775

(22) Filed: Jul. 30, 2013

(65) Prior Publication Data

US 2015/0036173 A1   Feb. 5, 2015

(51) Int. Cl.
G06F 3/12 (2006.01)
G06F 17/22 (2006.01)

(52) U.S. Cl.
CPC .......... *G06F 3/1275* (2013.01); *G06F 17/2288* (2013.01)

(58) Field of Classification Search
None
See application file for complete search history.

(56) References Cited

U.S. PATENT DOCUMENTS

| | | | | |
|---|---|---|---|---|
| 6,237,099 B1 * | 5/2001 | Kurokawa | | 726/4 |
| 6,327,611 B1 * | 12/2001 | Everingham | | 709/206 |
| 6,658,403 B1 * | 12/2003 | Kuroda et al. | | 1/1 |
| 7,035,910 B1 * | 4/2006 | Dutta et al. | | 709/217 |
| 7,895,166 B2 * | 2/2011 | Foygel et al. | | 707/667 |
| 7,996,367 B2 * | 8/2011 | Foygel et al. | | 707/668 |
| 7,996,439 B2 * | 8/2011 | Foygel et al. | | 707/803 |
| 8,196,029 B1 * | 6/2012 | Rucker et al. | | 715/200 |
| 8,423,512 B2 * | 4/2013 | Agarwal et al. | | 707/661 |
| 2001/0029582 A1 * | 10/2001 | Goodman et al. | | 713/193 |
| 2002/0059341 A1 * | 5/2002 | Harrison | | 707/505 |
| 2002/0078343 A1 * | 6/2002 | Rubin et al. | | 713/153 |
| 2004/0021698 A1 * | 2/2004 | Baldwin et al. | | 345/853 |
| 2004/0042830 A1 * | 3/2004 | Kaburagi et al. | | 399/366 |
| 2004/0158587 A1 * | 8/2004 | Shay et al. | | 707/201 |
| 2005/0102258 A1 * | 5/2005 | Tecu et al. | | 707/1 |
| 2005/0240759 A1 * | 10/2005 | Rubin et al. | | 713/153 |
| 2005/0264852 A1 * | 12/2005 | Kaburagi et al. | | 358/3.28 |
| 2006/0149831 A1 * | 7/2006 | Dutta et al. | | 709/217 |
| 2006/0282903 A1 * | 12/2006 | Jung et al. | | 726/27 |
| 2006/0284981 A1 * | 12/2006 | Erol et al. | | 348/207.1 |
| 2006/0286536 A1 * | 12/2006 | Mohler et al. | | 434/350 |
| 2006/0294152 A1 * | 12/2006 | Kawabe et al. | | 707/200 |
| 2007/0220417 A1 * | 9/2007 | Mathew et al. | | 715/511 |
| 2008/0134324 A1 * | 6/2008 | Jung et al. | | 726/21 |
| 2008/0235043 A1 * | 9/2008 | Goulandris et al. | | 705/1 |
| 2009/0024912 A1 * | 1/2009 | McCabe et al. | | 715/224 |
| 2009/0282462 A1 * | 11/2009 | Skaria et al. | | 726/3 |
| 2009/0292786 A1 * | 11/2009 | McCabe et al. | | 709/206 |
| 2010/0077218 A1 * | 3/2010 | Mitchel et al. | | 713/176 |
| 2010/0145985 A1 * | 6/2010 | Takahashi | | 707/769 |
| 2010/0241651 A1 | 9/2010 | Xiong et al. | | |
| 2010/0242085 A1 * | 9/2010 | Dutta et al. | | 726/1 |
| 2010/0274863 A1 * | 10/2010 | Foygel et al. | | 709/206 |
| 2010/0287260 A1 * | 11/2010 | Peterson et al. | | 709/219 |

(Continued)

*Primary Examiner* — Ted Barnes
(74) *Attorney, Agent, or Firm* — Osha Liang LLP

(57) ABSTRACT

A method for managing an electronic document (ED) using an electronic content management (ECM) system. The method includes: receiving, by the ECM system, a submission having the ED; generating an archived document corresponding to the ED; storing, by the ECM system, the ED and the archived document; distributing, by the ECM system, the archived document to multiple users including a first user and a second user; receiving, by the ECM system and from the first user, a first request for the ED; sending, by the ECM system, the ED to the first user in response to the first user having access rights to the ED.

12 Claims, 7 Drawing Sheets

(56) References Cited

U.S. PATENT DOCUMENTS

| | | | |
|---|---|---|---|
| 2011/0113110 A1* | 5/2011 | Foygel et al. | 709/206 |
| 2011/0133887 A1* | 6/2011 | Tian et al. | 340/5.86 |
| 2011/0197186 A1* | 8/2011 | Barker et al. | 717/168 |
| 2011/0276875 A1* | 11/2011 | McCabe et al. | 715/255 |
| 2012/0226823 A1* | 9/2012 | Livnat et al. | 709/246 |
| 2013/0019156 A1* | 1/2013 | Gonser et al. | 715/221 |
| 2013/0036142 A1* | 2/2013 | Barker et al. | 707/786 |
| 2013/0050512 A1* | 2/2013 | Gonser et al. | 348/207.1 |
| 2013/0124582 A1* | 5/2013 | Yamamoto | 707/812 |
| 2013/0151466 A1* | 6/2013 | Skaria et al. | 707/608 |
| 2013/0185565 A1* | 7/2013 | Appelbaum et al. | 713/176 |
| 2013/0254699 A1* | 9/2013 | Bashir et al. | 715/772 |
| 2013/0263283 A1* | 10/2013 | Peterson et al. | 726/28 |
| 2013/0275401 A1* | 10/2013 | Auger et al. | 707/704 |

* cited by examiner

ELECTRONIC CONTENT MANAGEMENT WORKFLOW

CROSS-REFERENCE TO RELATED APPLICATIONS

The present application contains subject matter related to the subject matter in U.S. patent application Serial No. 13/956,214, filed on Jul. 31, 2013, and entitled: "ELECTRONIC CONTENT MANAGEMENT WORFLOW WITH DOCUMENT VERSIONING".

BACKGROUND

Electronic Content Management (ECM) systems enable electronic documents (EDs) to be controlled in a workflow that enables multiple feature including: capture/input, record management, search, archiving, etc. Very often these EDs are generated in one editable document format (e.g., .PPTX, .DOCX, .XLSX) and archived in the workflow to another format that is less/not editable (e.g., .PDF). However, if a user accesses an archived document and wants to make further modifications to it, the user often does not have access to the original document on the ECM and has no easy way of discovering the original document location. In some cases, the user will manually recreate the document in an editable format (likely the format of the original document they cannot find), which is very inefficient. Regardless, users still wish to utilize ECMs to control EDs in one or more workflows.

SUMMARY

In general, in one aspect, the invention relates to a method for managing an electronic document (ED) using an electronic content management (ECM) system. The method comprises: receiving, by the ECM system, a submission comprising the ED; generating an archived document corresponding to the ED; storing, by the ECM system, the ED and the archived document; distributing, by the ECM system, the archived document to a plurality of users including a first user and a second user; receiving, by the ECM system and from the first user, a first request for the ED; sending, by the ECM system, the ED to the first user in response to the first user having access rights to the ED.

In general, in one aspect, the invention relates to a non-transitory computer readable medium (CRM) storing instructions for managing an electronic document (ED) using an electronic content management system (ECM). The instructions comprise functionality for: receiving, using the ECM system, a submission comprising the ED; generating an archived document corresponding to the ED; storing, using the ECM system, the ED and the archived document; distributing, by the ECM system, the archived document to a plurality of users including a first user and a second user; receiving, using the ECM system and from the first user, a first request for the ED; sending, using the ECM system, the ED to the first user in response to the first user having access rights to the ED.

In general, in one aspect, the invention relates to an electronic content management (ECM) system for managing an electronic document (ED). The system comprises: a processor; an file converter configured to generate an archived document corresponding to the ED; and an interface executing on the processor and configured to: distribute the archived document to a plurality of users including a first user and a second user; receive, from the first user, a first request for the ED; and send the ED to the first user in response to the first user having access rights to the ED.

Other aspects of the invention will be apparent from the following description and the appended claims.

DETAILED DESCRIPTION

Figure 1:
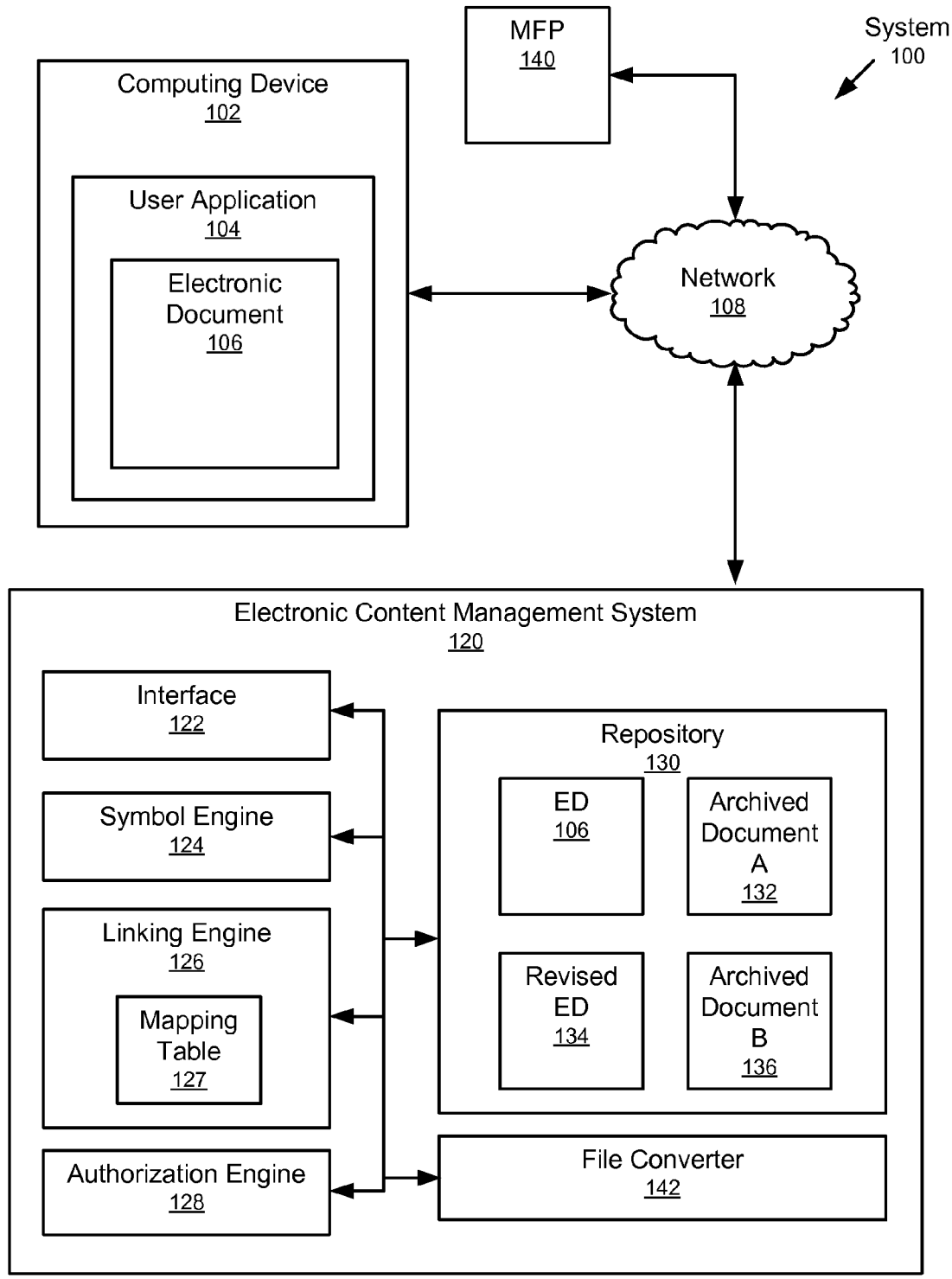
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide an ECM system for managing an ED and a method for managing an ED using an ECM system. When the ED is created, it may be submitted to the ECM for storage and access control. The ECM system generates a unique identifier (UID) and inserts/embeds a symbol (e.g., 2D barcode, data glyph) comprising the UID into the ED. An archived document (i.e., archived version) corresponding to the ED and also having the symbol is created. In one or more embodiments of the invention, it is more difficult to edit the archived document than the ED. For example, the ED may be in an Open Office XML (OOXML) format and thus be easy to edit, while the archived document may be in portable document format (PDF) and thus be more difficult to edit. The archived document may be distributed by the ECM system to one or more users via email, fax, printers (i.e., hardcopy versions), uploaded to websites accessed by the users, and/or in response to user requests for the ED received by the ECM system.

In general, embodiments of the invention permit a user to request the ED from the ECM system by sending a request comprising the symbol to the ECM system. The request may include the archived document and/or an image obtained by scanning a hardcopy version of the archived document, as both have the symbol. The ED is identified from the symbol, and assuming the user has the proper access rights, the ED is sent to the user in response to the request.

In general, embodiments of the invention permit a user to submit a revised version of the ED to the ECM system. The revised version submitted by the user includes the symbol. The ECM system may generate an archived document corresponding to the revised version. Moreover, assuming the user has the proper access rights, the ECM system may update a mapping previously linking the UID and the ED, to now link the UID and the revised ED. This effectively replaces/overwrites the ED with the revised version of the ED in the ECM system.

FIG. 1 shows a system (100) in accordance with one or more embodiments of the invention. As shown in FIG. 1, the system (100) has multiple components including at least one computing device (102), a multifunction printer (MFP) (140), and an ECM system (120). The ECM system (120) and/or the computing device (102) may be a personal computer (PC), a desktop computer, a mainframe, a server, a telephone, a kiosk, a cable box, a personal digital assistant (PDA), an electronic reader, a mobile phone, a smart phone, a tablet computer, etc. The MFP (140) includes printing functionality and scanning functionality. The MFP (140) may also include emailing functionality, faxing functionality, document storage functionality, etc. In one or more embodiments of the invention, the computing device (102), the MFP (140), and the ECM system (120) are connected using one or more networks (e.g., network (108)) having wired and/or wireless segments. Although FIG. 1 shows only one computing device (102), only one MFP (140), and only one ECM system (120), the system (100) may have any number of computing devices operated by any number of users, MFPs, and ECM systems connected by one or more networks.

In one or more embodiments of the invention, the computing device (102) executes the user application (104). The user application (104) is a software application operated by a user and configured to obtain, input, generate, display, and/or print an ED (e.g., Electronic Document (106)). Accordingly, the user application (104) may be a word-processing application, a spreadsheet application, a desktop publishing application, a graphics application, a photograph printing application, an Internet browser, a slide show generating application, a form, etc. The user application (104) may generate new EDs and/or obtain existing EDs for revising/updating.

In one or more embodiments of the invention, the ED (106) includes one or more graphical features (e.g., text characters, images, graphics, etc.) to be displayed/printed on or across one or more pages. In one or more embodiments of the invention, the ED (106) is represented/defined using a format that makes the ED (106) easy to edit (e.g., .PPTX, .DOCX, and .XLSX of Office Open XML).

In one or more embodiments of the invention, the ECM system (120) enables EDs to be controlled in a workflow that enables such things as: capture/input, version control, record management, search, archiving, etc. In one or more embodiments of the invention, the ECM system (120) includes an interface (122), a symbol engine (124), a linking engine (126), an authorization engine (128), a repository (130), and a file converter (142). Each of these components (122, 124, 126, 128, 130, 142) is discussed below.

In one or more embodiments of the invention, the ECM system (120) includes the symbol engine (124). The symbol engine (124) is configured to generate a unique identifier (UID) of any length. The UID may be a random number. The UID may be alphanumeric. The UID may be based on a time/date that an ED was submitted to the ECM (discussed below). In one or more embodiments of the invention, the symbol engine (124) is configured to generate a symbol (e.g., 1D barcode, 2D barcode, data glyph, plaintext, clipart, photograph, etc.) comprising the UID. The symbol engine (124) may also be configured to insert/embed a symbol into an ED. In one or more embodiments of the invention, the symbol engine (124) is configured to extract the UID from a symbol.

In one or more embodiments of the invention, the ECM system (120) includes the file converter (142). The file converter (142) is configured to generate an archived document for an ED. In other words, the file converter (142) is configured to convert the ED into the archived document. Although the ED is editable, the archived document corresponding to the ED is not editable or is more difficult to edit than the ED. For example, the archived document may be in the portable document format (PDF). Moreover, any attempt by a user to undo the conversion, results in a document that lacks much of the formatting/effects in the original ED. Accordingly, this resulting document is less editable than the original ED. As discussed above, a symbol may be inserted into an ED. Accordingly, the archived document corresponding to the ED may also include the symbol.

In one or more embodiments of the invention, the ECM system (120) includes the repository (130). The repository (130) may correspond to a database or data warehouse of any type. As shown in FIG. 1, the repository (130) is configured to store the ED (106), the revised ED (134), archived document A (132) corresponding to the ED (106), and archived document B (136) corresponding to revised ED (134). Both the ED (106) and the revised ED (134) are editable. Both archived document A (132) and archived document B (136) are more difficult to edit than their corresponding EDs (106, 134). In one or more embodiments of the invention, the repository (130) is external to the ECM system (120), but still accessible by the ECM system (120).

In one or more embodiments of the invention, the ECM system (120) includes the linking engine (126). The linking engine (126) is configured to generate mappings linking a UID to an ED and/or an archived document. In one or more embodiments of the invention, both the ED and the archived document have the symbol including the UID. Accordingly, the linking engine (126) may be configured to identify an ED and/or an archived document from a UID using a mapping. The mapping may be updated at a future time to link the UID to a revised version of the ED and/or an archived document corresponding to the revised version. In one or more embodiments of the invention, both the revised version and the archived document corresponding to the revised version also have the symbol including the UID. In one or more embodiments of the invention, following the update, the original ED and the archived document corresponding to the original ED are purged from the repository (130). In one or more embodiments of the invention, only the revised version and the archived document corresponding to the revised version remain.

In one or more embodiments of the invention, the linking engine (126) includes a mapping table (127) to manage mappings. Each row or column in the mapping table (127) may correspond to a different UID, and each entry in the mapping table (127) may include a reference (e.g., pointer, filename, storage location, etc.) to the ED and/or archived document. In one or more embodiments of the invention, both the ED and the archived document have the symbol including the UID. In one or more embodiments of the invention, all EDs and archived documents linked to UIDs are in the repository (130). In one or more embodiments of the invention, the linking engine (126) is configured to update a mapping for a UID by changing/replacing the ED reference and/or archived document reference linked to the UID. Although FIG. 1 shows the mapping table (127), the linking engine (126) may use any type of data structure to manage mappings.

In one or more embodiments of the invention, the ECM system (120) includes the authorization engine (128). The authorization engine (128) manages access rights for the documents stored in the repository (130). For example, some users may only be entitled to archived documents. Other users may be entitled to both EDs and archived documents. As another example, only some users may be entitled to submit EDs for storage in the repository (130). Any write and/or read access requests may be accepted or denied by the authorization engine (128) based on the user's credentials.

In one or more embodiments of the invention, the ECM system (120) includes the interface (122). The interface (122) is configured to distribute archived documents (132, 136) to one or more users by emailing the archived documents (132, 136), faxing the archived documents (132, 136), printing the archived documents (132, 136) (e.g., using MFP (140)), uploading the archived documents (132, 136) to a website, etc.

In one or more embodiments of the invention, the interface (122) is configured to receive, from a user, a request for an ED. This arises, for example, in scenarios where the user wishes to edit the ED. In one or more embodiments of the invention, the request includes a search string to locate the ED within the repository (130). The search string may correspond to one or more of the title, heading, author, etc. of the ED or any string found within the ED or associated with the ED.

As discussed above, when an ED is submitted to the ECM system (120), in one or more embodiments, a symbol is inserted into the ED. Accordingly, the request for the ED may include the symbol that has been inserted into the ED. The ED may be identified by extracting the UID from the symbol in the request, and then accessing a mapping linking the UID to the ED. Additionally or alternatively, the request itself may already include the UID but not have the symbol. Assuming the user has the proper access rights to the ED, the interface (122) is configured to respond to the request with the ED.

As also discussed above, in one or more embodiments, both the ED and the archived document corresponding to the ED are embedded with the same symbol. Accordingly, the request for the ED may include the corresponding archived document itself (i.e., the archived document is a file attached to/included with the request). In such embodiments, the UID is extracted from the symbol in the attached archived document. As another example, the request for the ED may include a scanned/faxed image (e.g., from MFP (140)) of at least one page of the archived document. In such embodiments, the UID is extracted from the symbol in the image. In one or more embodiments of the invention, the request is submitted by the MFP (140). The MFP (140) may have already extracted the UID from the image and/or the archived document. In such embodiments, the request might not need the image or the archived document if it includes the UID obtained by the MFP (140).

In one or more embodiments of the invention, the interface (122) is configured to receive submissions of EDs from users. Some submissions may include EDs that have never been managed by the ECM system (120). The EDs in such submissions might not include a symbol. Other submissions may include revised versions of EDs managed by the ECM system (120). The revised versions may include a symbol. Assuming the user submitting the revised version has the proper access rights, the revised version may be stored in the repository (130) and the corresponding mapping (i.e., the mapping involving the UID included in the symbol of the revised version) may be updated to reference the revised version of the ED now in the repository (130).

Figure 2:
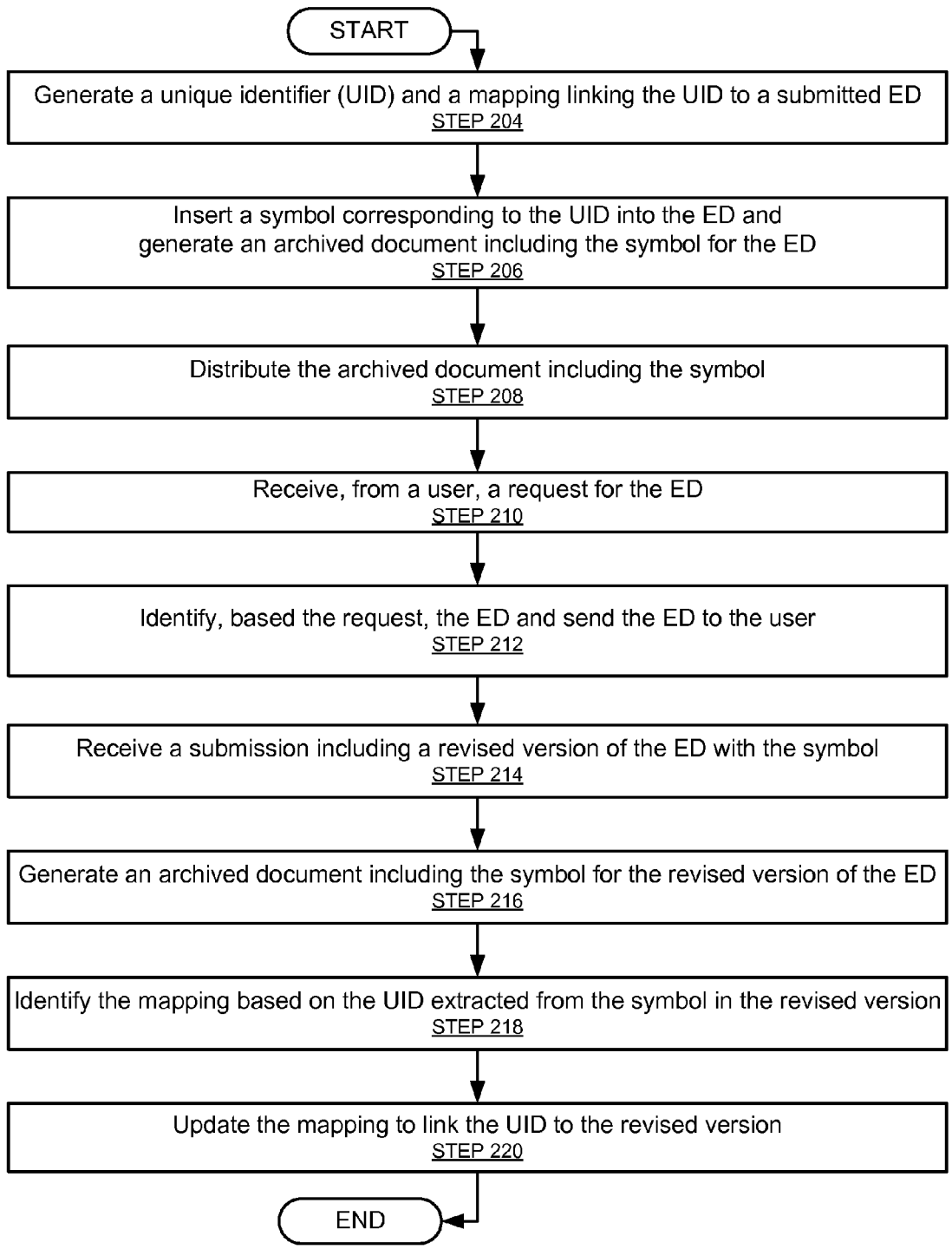
FIG. 2 and FIG. 3 show flowcharts in accordance with one or more embodiments of the invention.

FIG. 2 shows a flowchart in accordance with one or more embodiments of the invention. The process shown in FIG. 2 may be executed, for example, by one or more components (e.g., interface (122), symbol engine (124), linking engine (126), file converter (142)) of the ECM system (120), discussed above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a submission including an ED is received (STEP 204). The ED may be submitted by a user and received by an ECM system. The ED is represented/defined using an editable document format that makes the ED easy to edit. For example, the ED may be in the Office Open XML format.

In response to the submission, a unique identifier (UID) may be generated for the ED. The UID may be a randomly generated number or an alphanumeric string. The UID may include the filename of the submitted ED. For example, the UID may include the filename concatenated with a randomly generated alphanumeric string. In one or more embodiments of the invention, the UID is based on the date/time (i.e., timestamp) the ED was submitted. Further, in response to generating the UID, a mapping linking the UID and the ED is created. The mapping may be recorded in a mapping table. The mapping may identify the ED by its filename and/or the location where it is (or will be) stored in the ECM.

In STEP 206, a symbol corresponding to the UID is created. The symbol may be a 1D or 2D barcode, a data glyph, plaintext, clip art, a photograph, etc. The symbol may include the UID. The symbol may include the UID and the filename of the ED. Once the symbol exists, it is inserted (e.g., embedded) into the ED.

Further, an archived document is created for the ED. The archived document is generated by converting the ED to a different format that is more difficult, if not impossible, to edit. For example, the archived document may be in PDF. Like the ED, the archived document may include the symbol. Moreover, any attempt by a user to undo the conversion, results in a document that is missing much of the formatting/effects of the ED, and thus is also less editable.

In STEP 208, the archived document is distributed to one or more users. As discussed above, the archived document may include the symbol that has been inserted into the ED. The archived document may be emailed to one or more users, printed for one or more users, faxed to one or more users, uploaded to a website accessed by one or more users, sent in response to user requests received by the ECM, etc.

In STEP 210, a request for the ED is received from a user. For example, perhaps the user wishes to edit/update the ED. The request may be generated by many different methods and have many different formats.

In one or more embodiments of the invention, the request includes a search string for locating the ED. The search string may correspond to one or more of the title, heading, author, etc. or any other string found within the ED or associated with the ED. The search string might or might not include the UID.

In one or more embodiments of the invention, the request includes the symbol previously inserted into the ED. For example, the archived document (having the symbol) may be attached to or included in the request. As another example, the request may include an image created by a scanner or MFP. The image corresponds to a scanned page of the archived document having the symbol.

In STEP 212, the ED is identified from the request. If the request includes the search string, the ED may be identified using the search string. If the request includes the symbol or the UID in plaintext, the UID is extracted from the request, and the ED is identified from the mapping (i.e., the mapping specifies the ED corresponding to the UID). Assuming the user requesting the ED has the proper access rights, the ED is sent to the user in response to the request. If the user does not have the proper access rights, the request is denied or the archived document (not the requested editable ED) is sent to the user (e.g., for printing).

In STEP 214, a revised version of the ED is submitted to the ECM system. The revised ED may include the symbol. The revised version may be submitted by the user that requested the ED (STEP 212) or by a different user. The revised version may be in the same format as the ED. In STEP 216, an archived document corresponding to the revised version is generated. Like the revised version, the archived document corresponding to the revised version may include the symbol. The archived document is effectively the revised version of the ED in a format that is more difficult to edit.

In STEP 218, the mapping is identified based on the UID extracted from the symbol in the revised version of the ED. In STEP 220, assuming the user submitting the revised version of the ED has the proper access rights, the mapping is updated to link the UID to the revised version of the ED. Updating the mapping may include changing an entry in a mapping table to include the filename of the revised ED and/or to include the location in the ECM system where the revised version of the ED is (or will be) stored. Following execution of STEP 220, the ED and the archived document corresponding to the ED are deleted. The revised ED has effectively replaced/overwritten the original ED. Those skilled in the art, having the benefit of this detailed description, will appreciate that STEP 218 and STEP 220 may be executed before STEP 216.

Figure 3:
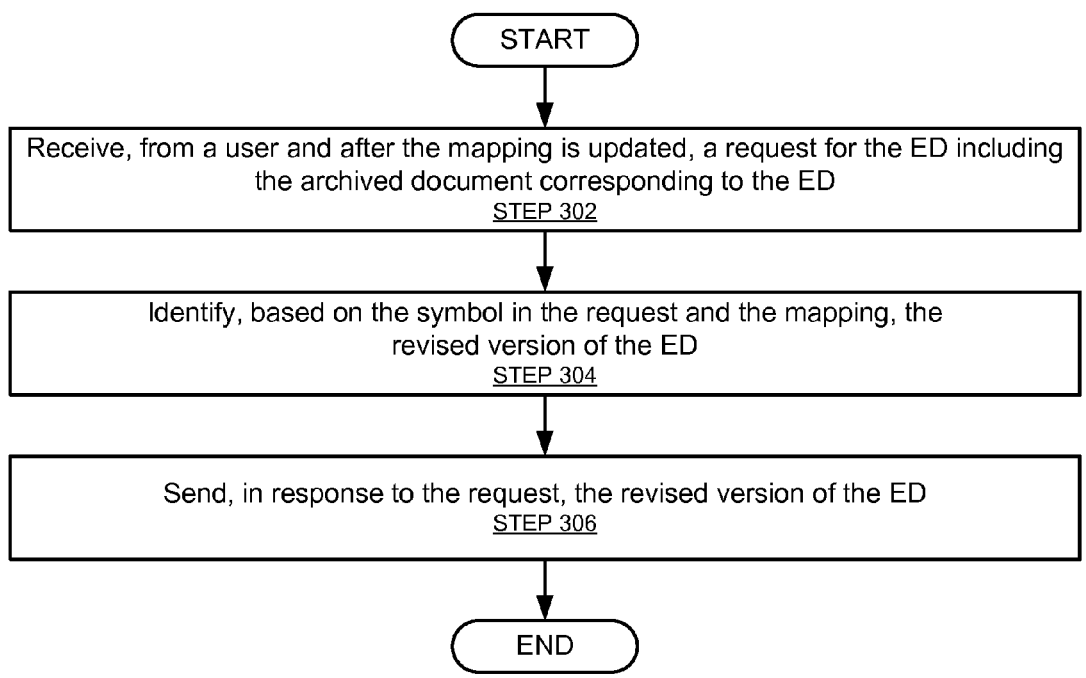

FIG. 3 shows a flowchart in accordance with one or more embodiments of the invention. The process shown in FIG. 3 may be executed, for example, by one or more components (e.g., interface (122), symbol engine (124), linking engine (126), filed converter (140)) of the ECM system (120), discussed above in reference to FIG. 1. One or more steps shown in FIG. 3 may be omitted, repeated, and/or performed in a different order among different embodiments of the invention. Accordingly, embodiments of the invention should not be considered limited to the specific number and arrangement of steps shown in FIG. 3. In one or more embodiments of the invention, one or more of the steps in FIG. 3 are executed after the steps in FIG. 2.

Following execution of STEP 220 in FIG. 2, the mapping has been updated to the link the UID to the revised version of the ED. Assume a user is in possession of an archived document corresponding to the original ED. For example, the user may have received the archived document during the distribution in STEP 208 of FIG. 2. Moreover, assume the user wishes to access the original ED. Accordingly, in STEP 302, the ECM system receives a request from the user for the ED. The request includes the symbol previously inserted into the ED. The request for the ED may have many formats. For example, in one format, the archived document possessed by the user is attached to or included in the request, and the symbol is extracted from the attached/included archived document. In another format, an image is attached to or included with the request for the ED, and the symbol is extracted from the image. The image is created by the user scanning a page of the archived document. Specifically, the image is created by the user scanning the page of the archived document having the symbol.

In STEP 304, the revised version of the ED is identified based on the symbol in the request (STEP 302) and the updated mapping. Specifically, the UID is extracted from the symbol and the corresponding mapping is retrieved. The mapping specifies the revised version of the ED corresponds to the UID.

In STEP 306, assuming the user requesting the ED has the proper access rights, the revised version of the ED is sent to the user in response to the request. In other words, although the user's request was for the ED, the response to the request includes the revised version of the ED. In the event the user does not have the proper access rights, the archived document corresponding to the revised version of the ED (but not the editable revised version itself) may be sent to the user instead (e.g., for printing).

Figure 4A:
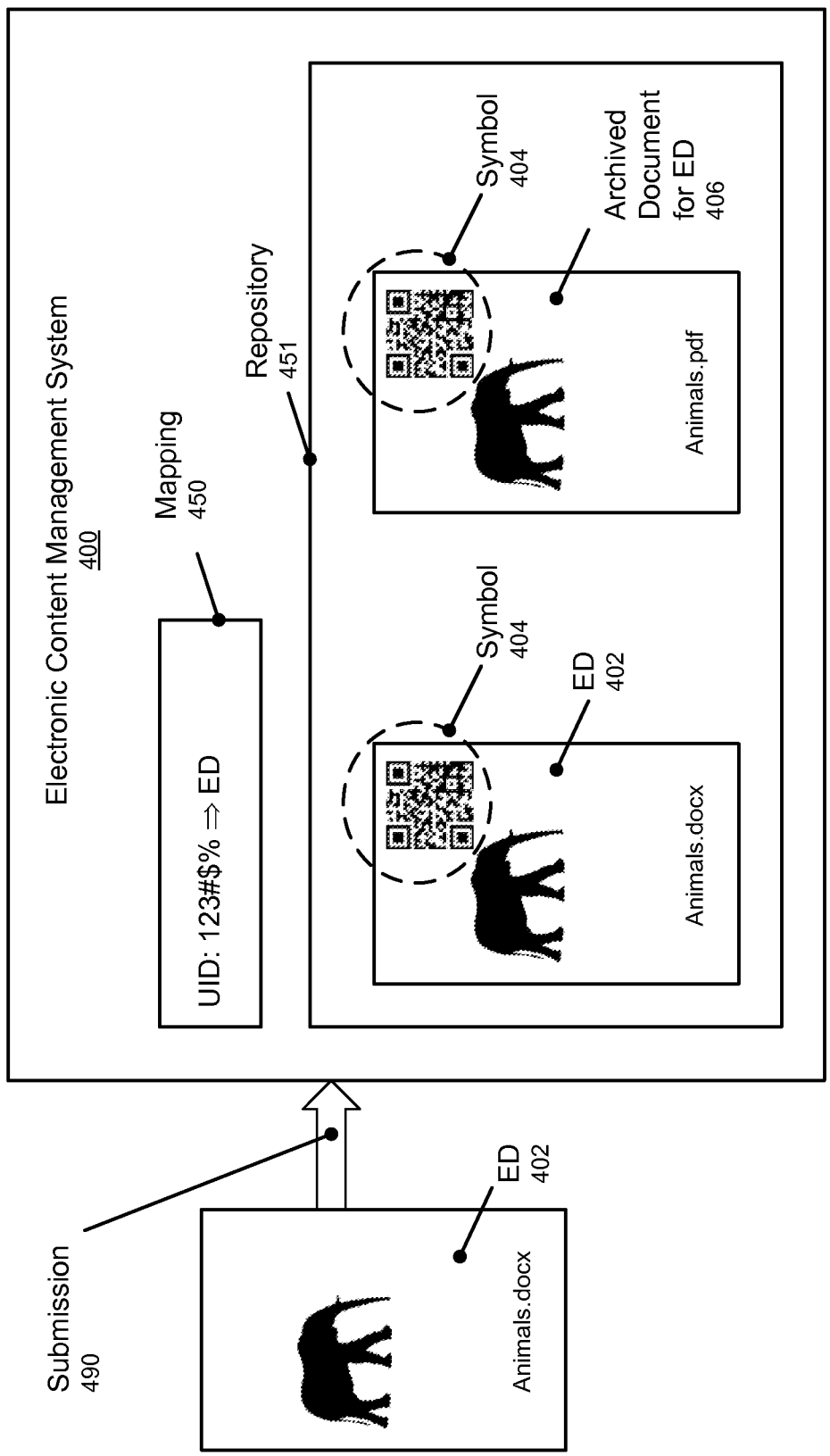
FIGS. 4A-4C show an example in accordance with one or more embodiments of the invention.
Figure 4B:
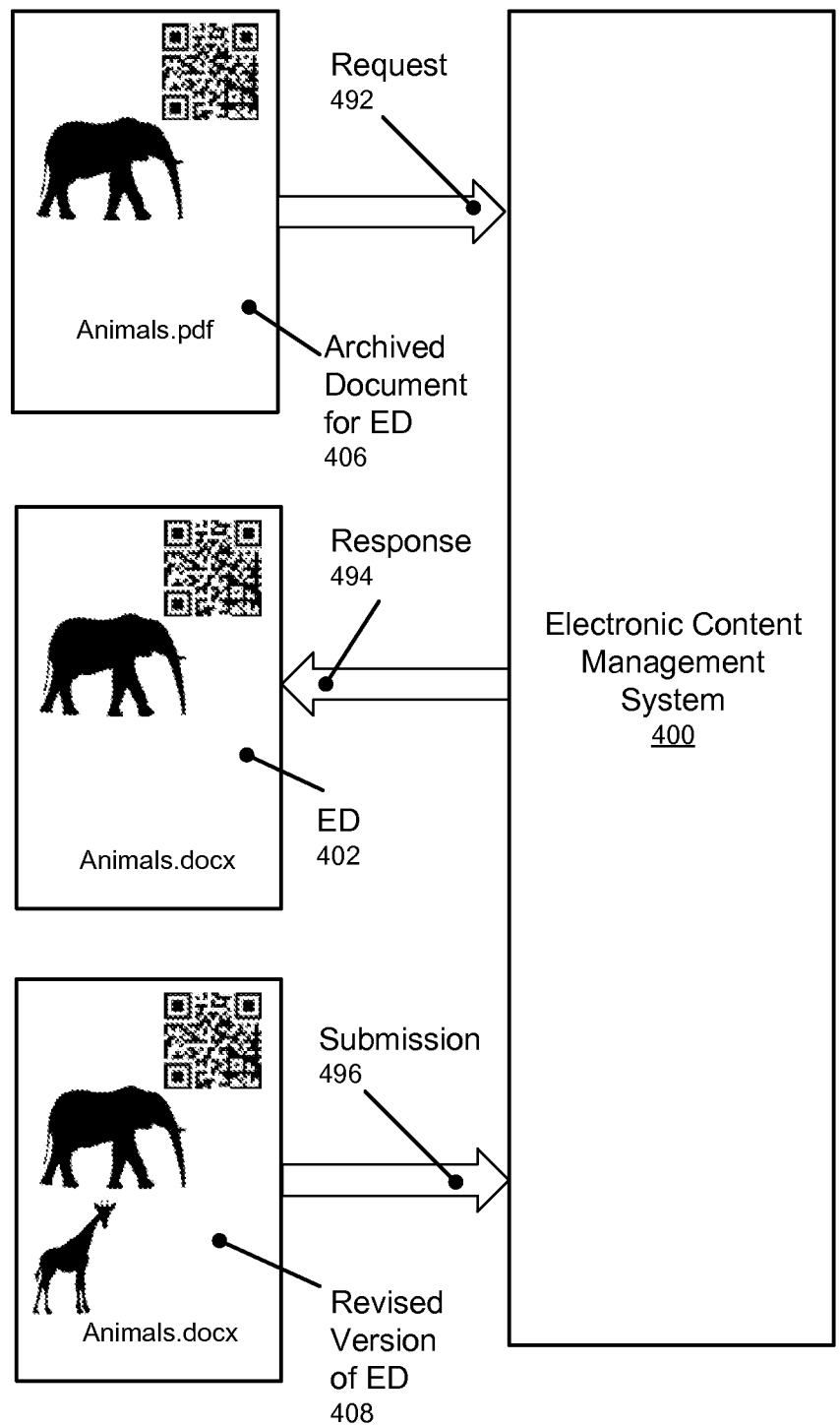
Figure 4C:
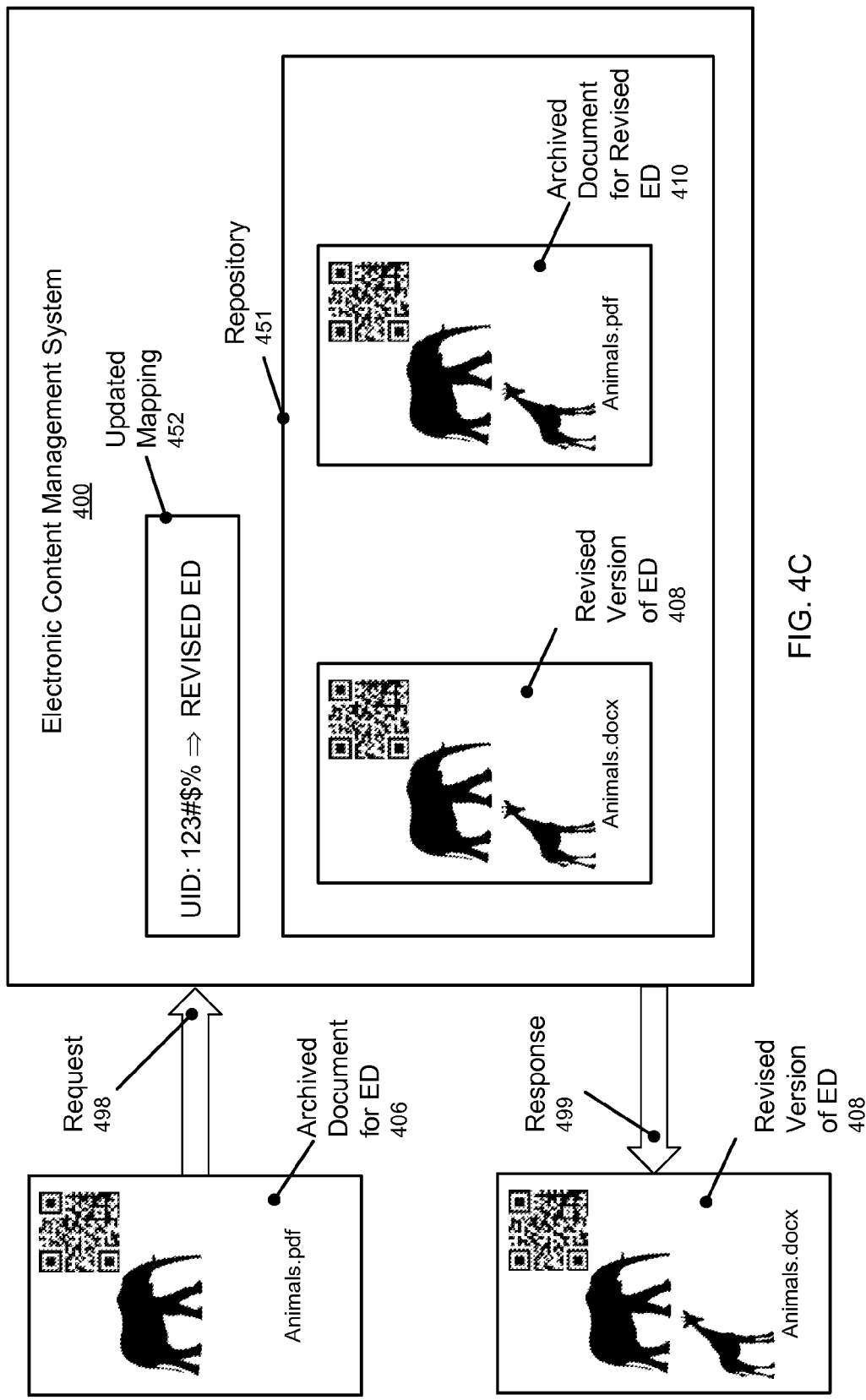

FIGS. 4A-4C show an example in accordance with one or more embodiments of the invention. As shown in FIG. 4A, there exists an ECM system (400). The ECM system (400) includes a repository (451). A user submits (490) an ED (402) to the ECM system (400). The ED (402) is in the .docx format and thus easily editable. In response to the submission (490), the ECM system (400) generates the UID: 123#$ % and a mapping (450) linking the UID to the ED (402). The ECM system (400) also generates a symbol (404) (i.e., 2D barcode) comprising the UID and the filename (i.e., Animals.docx) of the ED (402). The symbol is inserted into the ED (402) and stored in the repository (451). Further, an archived document (406) corresponding to the ED is generated. The archived document (406) also includes the symbol (404). The archived document (406) is essentially the ED (402) in PDF. Accordingly, it is more difficult to edit the archived document (406) than the ED (402). The archived document (406) may be distributed (e.g., emailed, printed, faxed, uploaded to website (s), etc.) to one or more users.

The events of FIG. 4B take place at some point after distributing the archived document (406). In FIG. 4B, the ECM system (400) receives, from a user, a request (492) for the ED. For example, the user may want access to the ED (402) in order to update it. Although the user has the archived document (406) corresponding to the ED (402), as discussed above, the archived document (406) is difficult to edit/update. Moreover, if the user attempted to convert the archived document (406) back to the format of the ED (402), much of the formatting/effects would be lost. As shown in FIG. 4B, the request (492) includes the archived document (406). For example, the archived document (406) is attached to the request (492) or embedded in the request (492).

Upon receiving the request (492), the ECM system (400) extracts the UID from the symbol (404) in the request (492). The ECM system (400) retrieves the mapping (450) for the UID and identifies, from the mapping (450), the ED (402) as the ED being requested by the user. Assuming the user has the proper access rights/permissions, the ED (402) is sent in response (494). As shown in FIG. 4B, the ED (402) in the response (494) includes the symbol (i.e., 2D barcode).

At some future point, the user submits (496) a revised version (408) of the ED. The revised version (408) includes the symbol (i.e., 2D barcode). Upon receiving the submission (496), the ECM system (400) extracts the UID from the symbol (404) in the revised version (408). The ECM system (400) retrieves the mapping (450) for the UID. The mapping (450) is updated to link the UID to the revised version (408) of the ED.

FIG. 4C shows the ECM system (400) after receiving the submission (496) with the revised version of the ED (408). As shown in FIG. 4C, the ECM system (400) includes the updated mapping (452) linking the UID: 123#$ % to the revised version (408). Moreover, the repository (451) now stores the revised version (408) and archived document (410) corresponding to the revised version (408). Both the revised version (408) and the archived document (410) corresponding to the revised version (408) have the symbol (i.e., barcode).

At some future point, a request (498) is received from a different user for the original ED (402). The request (498)

includes the archived document (406) for the original ED (402). Upon receiving the request (498), the ECM system (400) extracts the UID from the symbol in the archived document (406) for the ED. The ECM system (400) retrieves the updated mapping (452) for the UID and identifies, based on the updated mapping (452), that the revised version (408) now corresponds to the UID. In response (499) to the request (498), assuming the user has the necessary access rights/permissions, the revised version of the ED (408) is sent.

As another example, assume an MFP (not shown) is attached to the ECM system (400). Moreover, assume a user is in possession of a hardcopy of the archived document (406) for the ED. The user may place the hardcopy (or at least the page of the hardcopy having the symbol) on the platen of the MFP and press the "Print Latest Version of Document" key. In response to pressing the key, the MFP scans the hardcopy, generates a request, and sends the request to the ECM system (400). The MFP may extract the UID from the symbol in the scanned image and include the UID in the request. Additionally or alternatively, the scanned image is included in the request and the ECM system (400) extracts the UID from the symbol in the scanned image. Once the UID is obtained by the ECM system (400), the updated mapping (452) is accessed to identify the archived document (410) for the revised ED. This archived document (410) is sent to the MFP for printing. Accordingly, although the user started with a hardcopy of the out-of-date ED, the user now has a hardcopy of the latest version of the ED.

Embodiments of the invention may have one or more of the following advantages: giving an ECM system the ability to share archival electronic documents while enabling users who would like to edit the documents access to a more editable form of the document; easing discovery of the editable document using a visible UID (i.e., symbol) added to the document content; etc.

Figure 5:
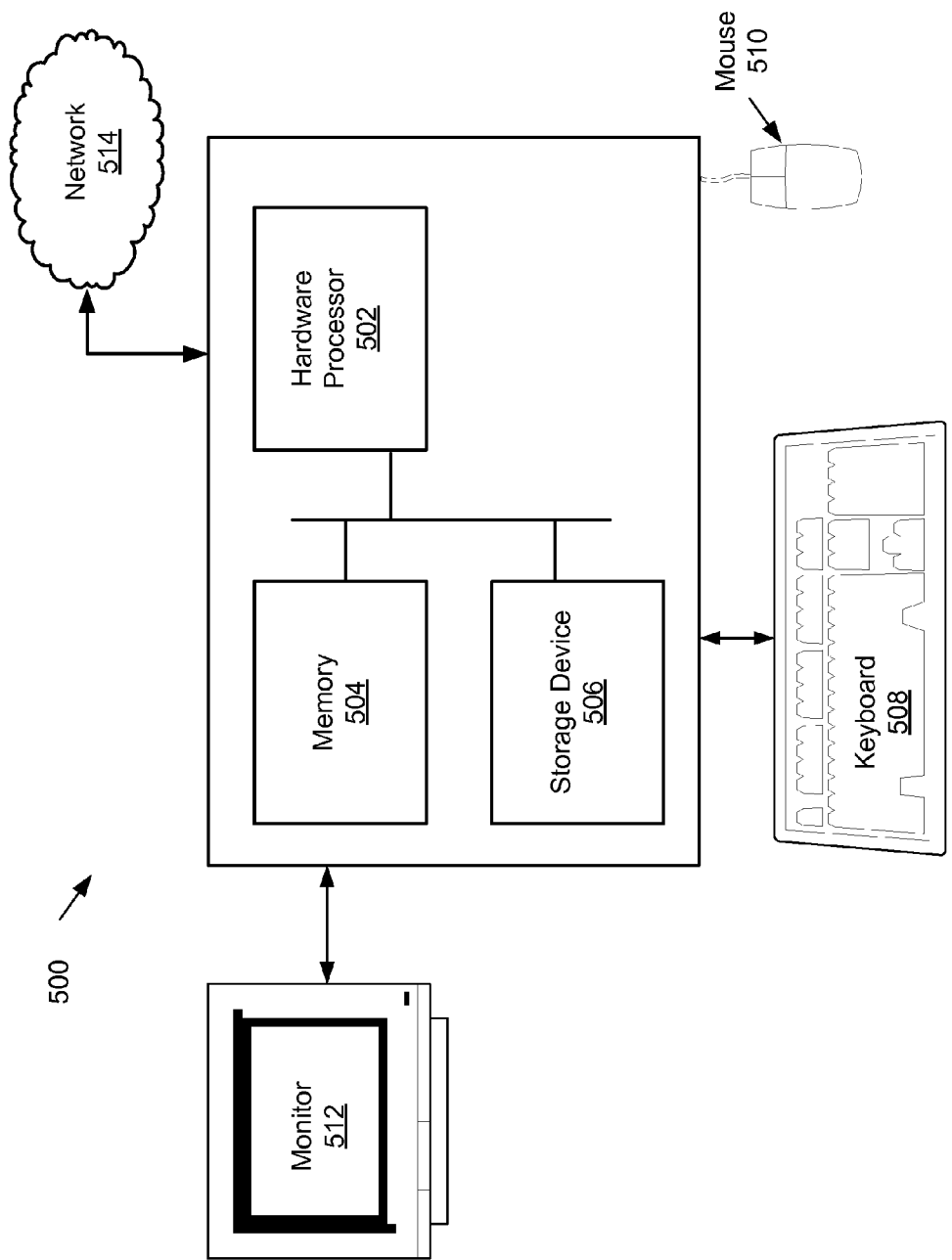
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), an associated memory (504) (e.g. random access memory (RAM), cache memory, flash memory, etc.), a storage device (506) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g. a liquid crystal display (LCD), a plasma display, or cathode ray tube (CRT) monitor). The computer system (500) may be connected to a network (514) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g. the computing device, the page rendering device, the display device, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing an electronic document (ED) using an electronic content management (ECM) system, comprising:
   receiving, by the ECM system, a submission comprising the ED;
   generating an archived document corresponding to the ED;
   storing, by the ECM system, the ED and the archived document;
   distributing, by the ECM system, the archived document to a plurality of users including a first user having access rights to the ED and a second user not having rights access to the ED;
   receiving, by the ECM system and from the first user, a first request for the ED; and
   sending, by the ECM system, the ED to the first user in response to the first user having access rights to the ED;
   generating, in response to receiving the submission, a unique identifier (MD) and a mapping linking the UID to the ED;
   inserting a symbol corresponding to the UID into the ED, wherein the archived document comprises the symbol;
   extracting the UID from the first request;
   identifying, by the ECM system, the ED based on the UID extracted from the first request and the mapping;
   receiving a submission comprising a revised version of the ED from the first user, wherein the revised version of the ED comprises the symbol;
   identifying, based on the symbol in the revised version, the mapping;
   updating the mapping to link the UID to the revised version of the ED;
   receiving, from a multifunction printer (MFP) operated by the second user and after updating the mapping, a second request comprising the UID, wherein the second request is generated by the MFP after the second user scans a hardcopy of the archived document corresponding to the ED;
   identifying, by the ECM system and based on the mapping and the UID, an archived document corresponding to the revised version of the ED; and
   sending the archived document corresponding to the revised version of the ED to the MFP for printing.

2. The method of claim 1, wherein the ED is in Open Office XML (OOXML) format, and wherein the archived document is in portable document format (PDF).

3. The method of claim 1, further comprising:
receiving, by the ECM system and from the second user, a second request for the ED; and
sending, by the ECM system, the archived document to the second user in response to the second user not having access rights to the ED.

4. The method of claim 1, wherein the first request comprises a search string for the ED.

5. The method of claim 1, wherein the archived document comprising the symbol is embedded in the first request, and wherein the UID is extracted from the symbol.

6. The method of claim 1, wherein the ECM is connected to a multifunction printer (MFP), wherein the MFP obtains the UID from a hardcopy of the archived document, and wherein the request includes the UID obtained by the MFP.

7. The method of claim 1, further comprising:
receiving, from the second user and after updating the mapping, a second request for the ED and comprising the archived document;
extracting the UID from the archived document in the second request;
identifying, based on the mapping and the UID extracted from the archived document in the second request, the revised version; and
sending, in response to the second request, the revised version to the second user.

8. A non-transitory computer readable medium (CRM) storing instructions for managing an electronic document (ED) using an electronic content management system (ECM), the instructions comprising functionality for:
receiving, using the ECM system, a submission comprising the ED;
generating an archived document corresponding to the ED;
storing, using the ECM system, the ED and the archived document;
distributing, by the ECM system, the archived document to a plurality of users including a first user having access rights to the ED and a second user not having rights access to the ED;
receiving, using the ECM system and from the first user, a first request for the ED; and
sending, using the ECM system, the ED to the first user in response to the first user having access rights to the ED;
generating, in response to receiving the submission, a unique identifier (UID) and a mapping linking the UID to the ED;
inserting a symbol corresponding to the UID into the ED, wherein the archived document comprises the symbol;
extracting the UID from the first request;
identifying, by the ECM system, the ED based on the UID extracted from the first request and the mapping;
receiving a submission comprising a revised version of the ED from the first user, wherein the revised version of the ED comprises a symbol;
identifying, based on the symbol in the revised version, the mapping;
updating the mapping to link the UID to the revised version of the ED;
receiving, from a multifunction printer (MFP) operated by the second user and after updating the mapping, a second request comprising the UID wherein the second request is generated by the MFP after the second user scans a hardcopy of the archived document corresponding to the ED;
identifying, by the ECM system and based on the mapping and the UID, an archived document corresponding to the revised version of the ED; and
sending the archived document corresponding to the revised version of the ED to the MFP for printing.

9. The non-transitory CRM of claim 8, the instructions further comprising functionality for:
receiving, using the ECM system and from the second user, a second request for the ED; and
sending, using the ECM system, the archived document to the second user in response to the second user not having access rights to the ED.

10. The non-transitory CRM of claim 8, wherein the archived document comprising the symbol is embedded in the first request, and wherein the UID is extracted from the symbol.

11. The non-transitory CRM of claim 8, the instructions farther comprising functionality for:
receiving, from the second user and after updating the mapping, a second request for the ED and comprising the archived document;
extracting the UID from the archived document in the second request;
identifying, based on the mapping and the UID extracted from the archived document in the second request, the revised version; and
sending, in response to the second request, the revised version to the second user.

12. An electronic content management (ECM) system for managing an electronic document (ED), comprising:
a processor that:
generates an archived document corresponding to the ED;
distributes the archived document to a plurality of users including a first user having access rights to the ED and a second user not having rights access to the ED;
receives, from the first user, a first request for the ED;
sends the ED to the first user in response to the first user having access rights to the ED;
generates, in response to receiving a submission comprising the ED, a unique identifier (UID) and a mapping linking the UID to the ED;
inserts a symbol corresponding to the UID into the ED, wherein the archived document comprises the symbol;
extracts the UID from the first request;
identifies the ED based on the UID extracted from the first request and the mapping;
receives a submission comprising a revised version of the ED from the first user, wherein the revised version of the ED comprises the symbol;
identifies, based on the symbol in the revised version, the mapping;
updates the mapping to link the UID to the revised version of the ED;
receives, from a multifunction printer (MFP) operated by the second user and after updating the mapping, a second request comprising the UID wherein the second request is generated by the MFP after the second user scans a hardcopy of the archived document corresponding to the ED;
identifies, based on the mapping and the UID, an archived document corresponding to the revised version of the ED; and
sends the archived document corresponding to the revised version of the ED to the MFP for printing.

* * * * *